(12) United States Patent
Eavenson, Sr. et al.

(10) Patent No.: US 6,662,538 B2
(45) Date of Patent: Dec. 16, 2003

(54) LAWN MOWER MAIN FRAME AND SUB-FRAME ASSEMBLY

(75) Inventors: Jimmy N. Eavenson, Sr., Aurora, OH (US); Mike Utz, Streetsboro, OH (US)

(73) Assignee: Commerical Turf Products, Ltd., Streetsboro, OH (US)

( * ) Notice: Subject to any disclaimer, the term of this patent is extended or adjusted under 35 U.S.C. 154(b) by 0 days.

(21) Appl. No.: 09/941,294

(22) Filed: Aug. 28, 2001

(65) Prior Publication Data

US 2003/0041577 A1 Mar. 6, 2003

(51) Int. Cl.⁷ .............................................. A01D 69/08
(52) U.S. Cl. ...................................................... 56/11.8
(58) Field of Search ........................ 60/487, 490, 491; 56/11.8

(56) References Cited

U.S. PATENT DOCUMENTS

| | | | | |
|---|---|---|---|---|
| 1,510,406 A | * | 9/1924 | Lewis | 280/89.11 |
| 3,230,787 A | * | 1/1966 | Siegal | 474/14 |
| 3,235,023 A | * | 2/1966 | Gilbert | 180/401 |
| 3,460,325 A | * | 8/1969 | Musgrave | 56/11.6 |
| 3,515,313 A | * | 6/1970 | Siems | 222/623 |
| 4,320,814 A | | 3/1982 | Middelhoven | |
| 4,535,867 A | | 8/1985 | Botar | |
| 4,627,237 A | * | 12/1986 | Hutson | 60/487 |
| 4,696,164 A | * | 9/1987 | Giere | 60/485 |
| 5,067,933 A | * | 11/1991 | Hardesty et al. | 475/32 |
| 5,230,519 A | * | 7/1993 | Nishimura et al. | 475/83 |
| 5,251,429 A | | 10/1993 | Minato et al. | |
| 5,317,936 A | * | 6/1994 | Shiba et al. | 74/606 R |
| 5,333,702 A | | 8/1994 | Gaffney et al. | |
| 5,447,028 A | * | 9/1995 | Azuma et al. | 60/487 |
| 5,950,500 A | * | 9/1999 | Okada et al. | 74/606 R |
| 5,980,416 A | * | 11/1999 | Gafvert | 475/230 |

* cited by examiner

Primary Examiner—Árpád F. Kovács
(74) Attorney, Agent, or Firm—Roger D. Emerson; Timothy D. Bennett; Brouse McDowell

(57) ABSTRACT

A lawn mower has a mainframe, a sub-frame bolted onto the mainframe for ease of installation and removal and traction motors mounted on the sub-frame. The traction motors have shafts for driving engagement with drive wheels used in moving the lawn mower. Hydraulic pumps are mounted onto the sub-frame and have pump drive pulleys. Pump belts operatively connect the pump drive pulleys to the mower driven pulley. Preferably the sub-frame has end plates connected by tie rods. Each of the end plates supports one of the traction motors on one side and one of the frame pumps on the other side.

3 Claims, 5 Drawing Sheets

LAWN MOWER MAIN FRAME AND SUB-FRAME ASSEMBLY

BACKGROUND OF THE INVENTION

A. Field of Invention

The present invention pertains to the art of methods and apparatuses for a lawn mower having a power head main frame and a sub-frame.

B. Description of the Related Art

Currently in the art of lawn mowers, zero turn ride on mowers are well known and are designed so that the traction drive transmission components are individually mounted on the main frame. A series of holes in the mounting surface are provided to accommodate a variety of components. The individual hydraulic pumps and left and right traction motors are mounted separately on the frame to accommodate various sizes and configurations of mowers. Accordingly, when assembling a mower, the hydraulic pumps and left and right traction motors are mounted on the main frame, adjusted for alignment, and connected with the rear engine on the main frame. This piece-by-piece assembly is time consuming and requires the skills of trained personnel.

Another problem arises when mowers need to be repaired in the field. When the main frame is bent or broken the current practice has been to replace the complete main frame assembly. This is costly from a labor and materials standpoint. Also if individual pumps or traction motors need to serviced and repaired, difficulties have been encountered gaining access to the product fittings, mounting hardware, and hydraulic pumps.

The present invention provides methods and apparatuses for reducing these problems. The difficulties that are inherit in the art are therefore overcome in a way that is simple and efficient, while providing better and more advantageous results.

SUMMARY OF THE INVENTION

According to one aspect of the present invention, the lawn mower includes a main frame, a sub-frame mounted on the main frame, traction motors mounted on the sub-frame and having shafts for driving engagement with wheels of the mower, hydraulic pumps mounted on the sub-frame, pump drive pulleys mounted on the pumps, a main frame mower driven pulley mounted on the main frame, and pump belts trained around the pump pulleys and the mower-drive pulley.

According to another aspect of the present invention, there is provided a sub-frame assembly for mounting on a lawn mower main frame comprising parallel spaced apart end plates, connecting rods between the end plates, and traction motors mounted on the end plates for supporting drive wheels of the mower.

According to another aspect of the present invention, a method of installing a sub-frame assembly on a main frame of a mower having a power source is provided wherein traction motors and wheels are mounted on the sub-frame apart from the main frame and the sub-frame with the traction motors is then fastened to the main frame and connected to the power source on the main frame.

DESCRIPTION OF THE PREFERRED EMBODIMENT

Figure 4:
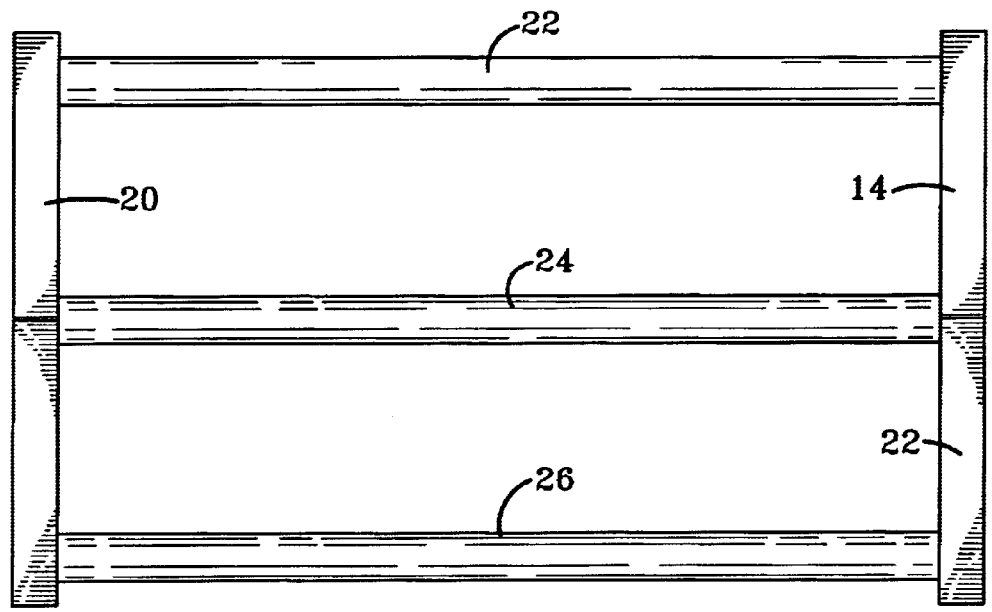
FIG. 4 is a bottom view of the sub-frame taken along the plane of line 4—4 in FIG. 3.
Figure 3:
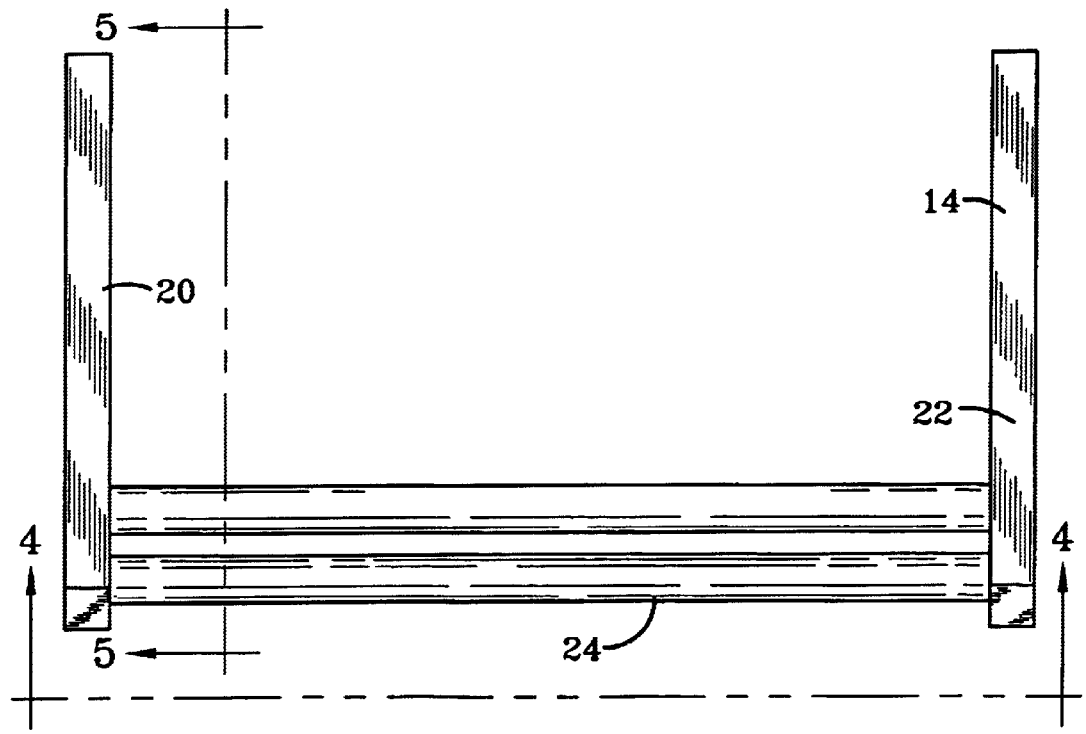
FIG. 3 is an elevation of the sub-frame embodying the invention.
Figure 5:
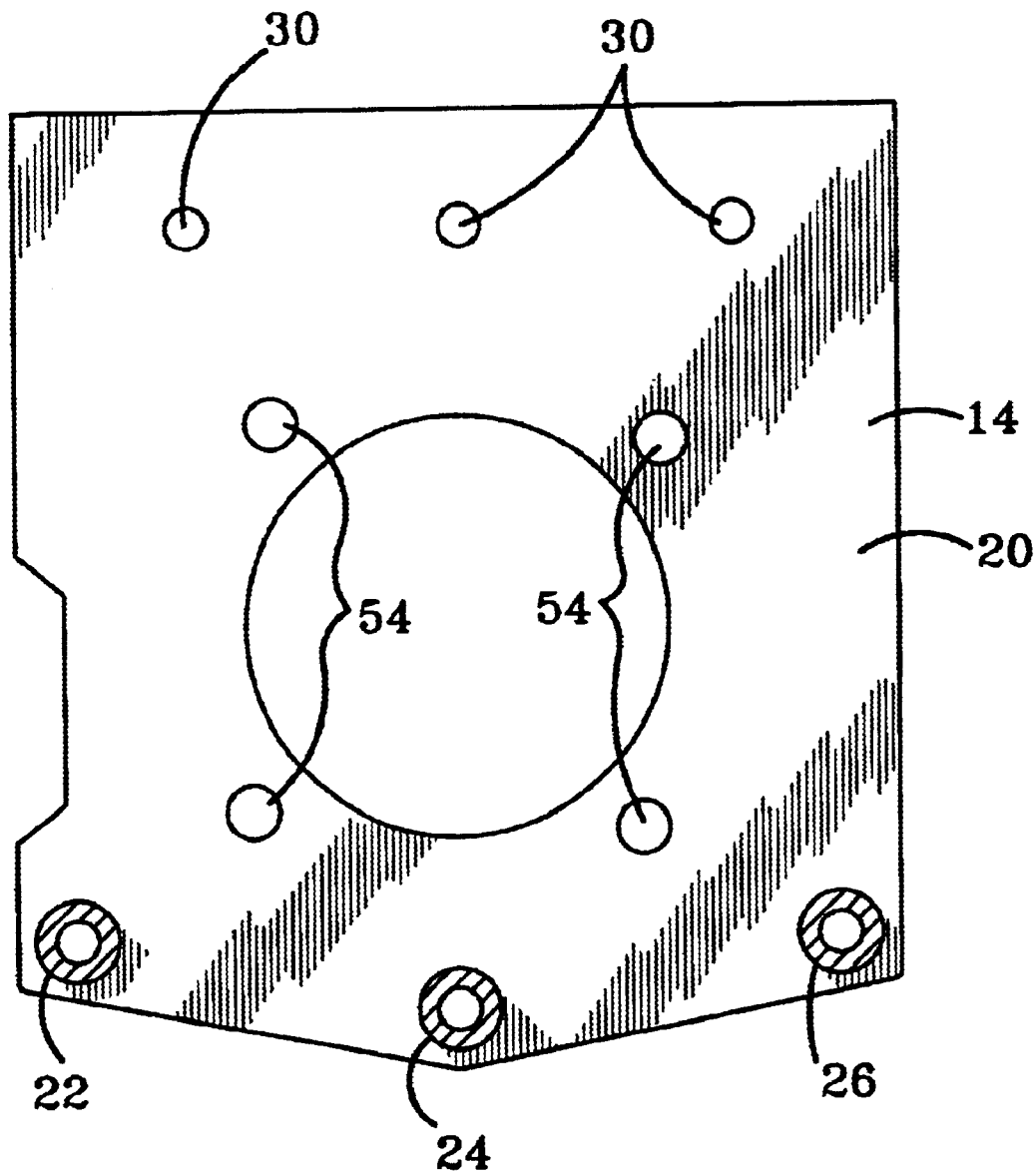
FIG. 5 is a sectional end view of a sub-frame end plates and connecting bars taken along the plane of line 5—5 in FIG. 4.

With reference now to the drawings, which are for the purpose of illustrating a preferred embodiment of the invention and a modification only and not for the purpose of limiting the same, FIGS. 1–5 show a main-frame and sub-frame assembly 10 for a lawn mower having a power source such as an engine, not shown, mounted on a main frame 12. In accordance with the invention a sub-frame 14 is fastened to the main frame as by bolts 16, extending through plates 18 fastened to the edges of the main frame 12 and through end plates 20 of the sub-frame 14. As shown in FIGS. 4 and 5 the sub-frame 14 has end plates 20, tie rods 22, 24, and 26 fastened to the lower edges of the end plates as by welding. Bolt holes 30 at the upper edge of the end plates 20 and 22, provide for receiving bolts 16, removably connecting the sub-frame 14 to the main frame 18.

Figure 1:
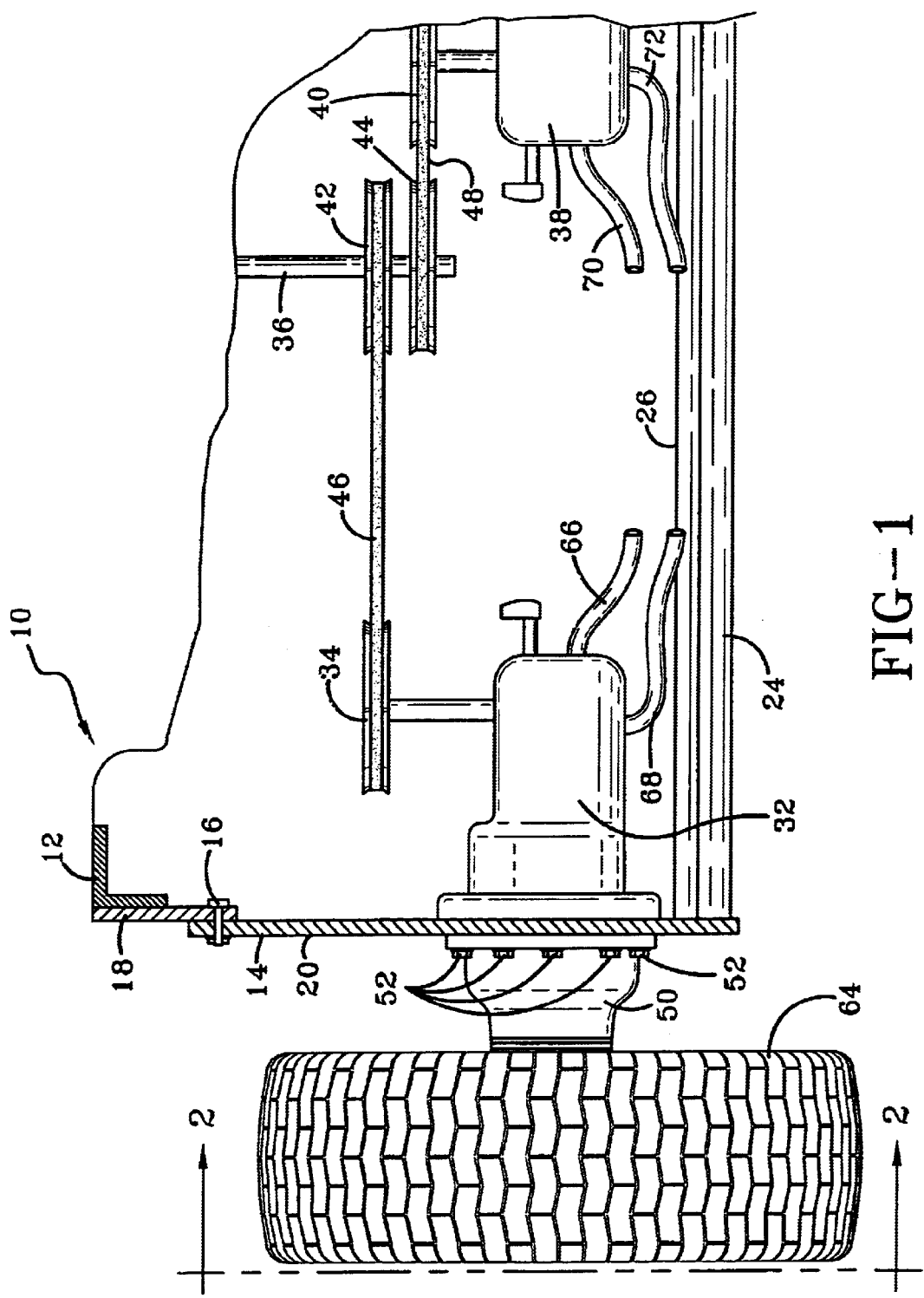
FIG. 1 is an elevation of the sub-frame mounted on the main frame with parts being broken away.
Figure 2:
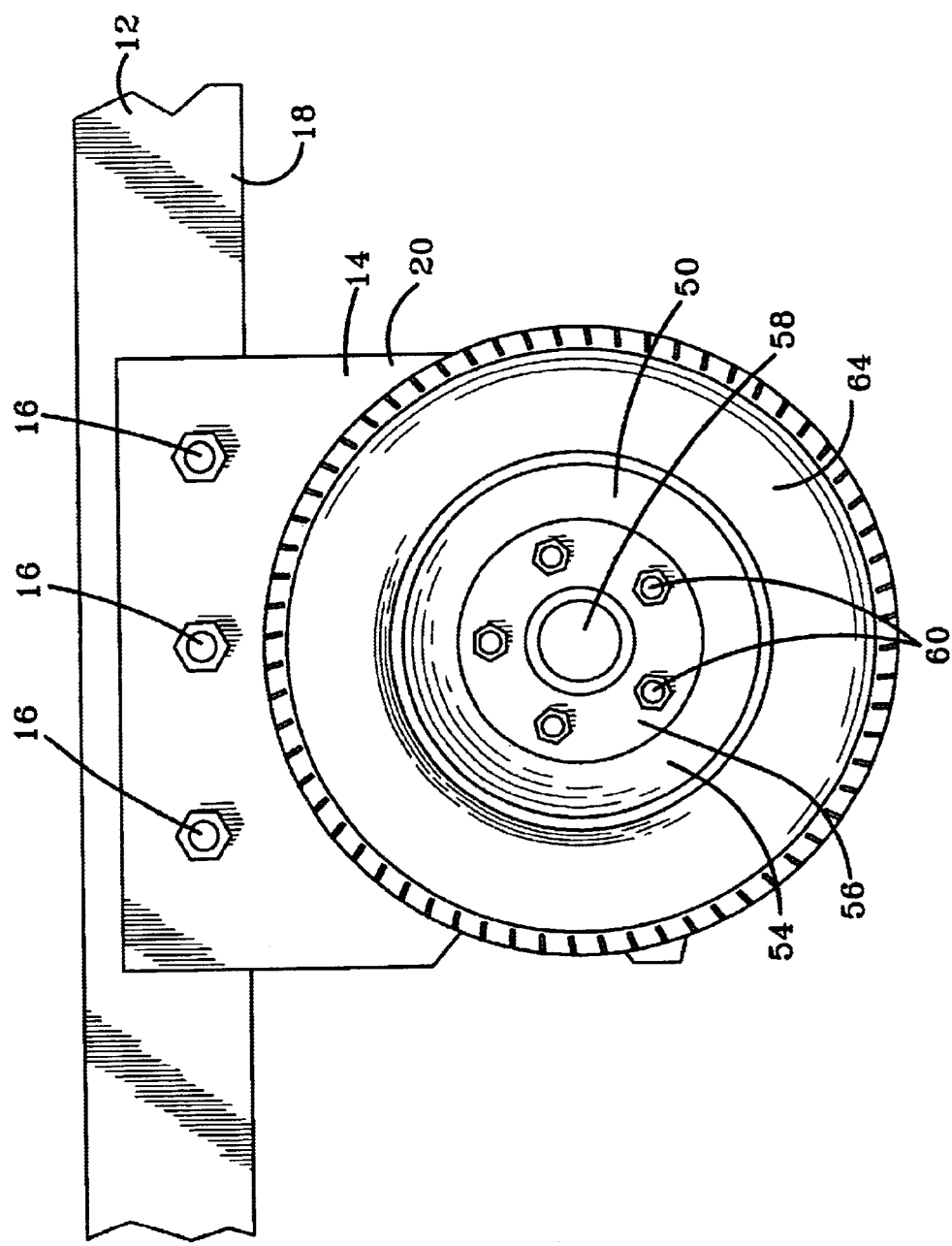
FIG. 2 is a fragmentary end view of the sub-frame and main frame taken along the plane of line 2—2 in FIG. 1.

Referring to FIG. 1, the sub-frame components of the end plate 20 are shown it being understood that the components mounted on the end plate at the other side are the same. Mounted on the inner face of the end plate 20 is a hydraulic pump 32 driven by a pump drive pulley 34, mounted on the hydraulic pump. As shown in FIG. 1 a power shaft 36 rotated by an engine mounted on the main frame 12 extends vertically into the space between the hydraulic pump 32 and a similar hydraulic pump 38 mounted on the opposite end plate, not shown. The hydraulic pump 38 also has a pump drive pulley 40. The power shaft 36 has pulleys 42 and 44 in alignment with the pump drive pulleys 34 and 40 so that V-belts 46 and 48, may be trained around these pulleys and the pump drive pulleys 34 and 40 for driving the hydraulic pumps 32 and 38. Also mounted on the end plate 20 is a traction motor 50 fastened by bolts 52 threaded through boltholes 54 in the end plate.

A wheel 54 may be bolted on a hub 56 of a shaft 58 driven by the traction motor 50 by nuts 60 on studs 62 of the hub 56. Tire 64 may be mounted on the wheel 54. A similar traction motor, wheel and tire may be mounted on the opposite plate 22.

Figure 6:
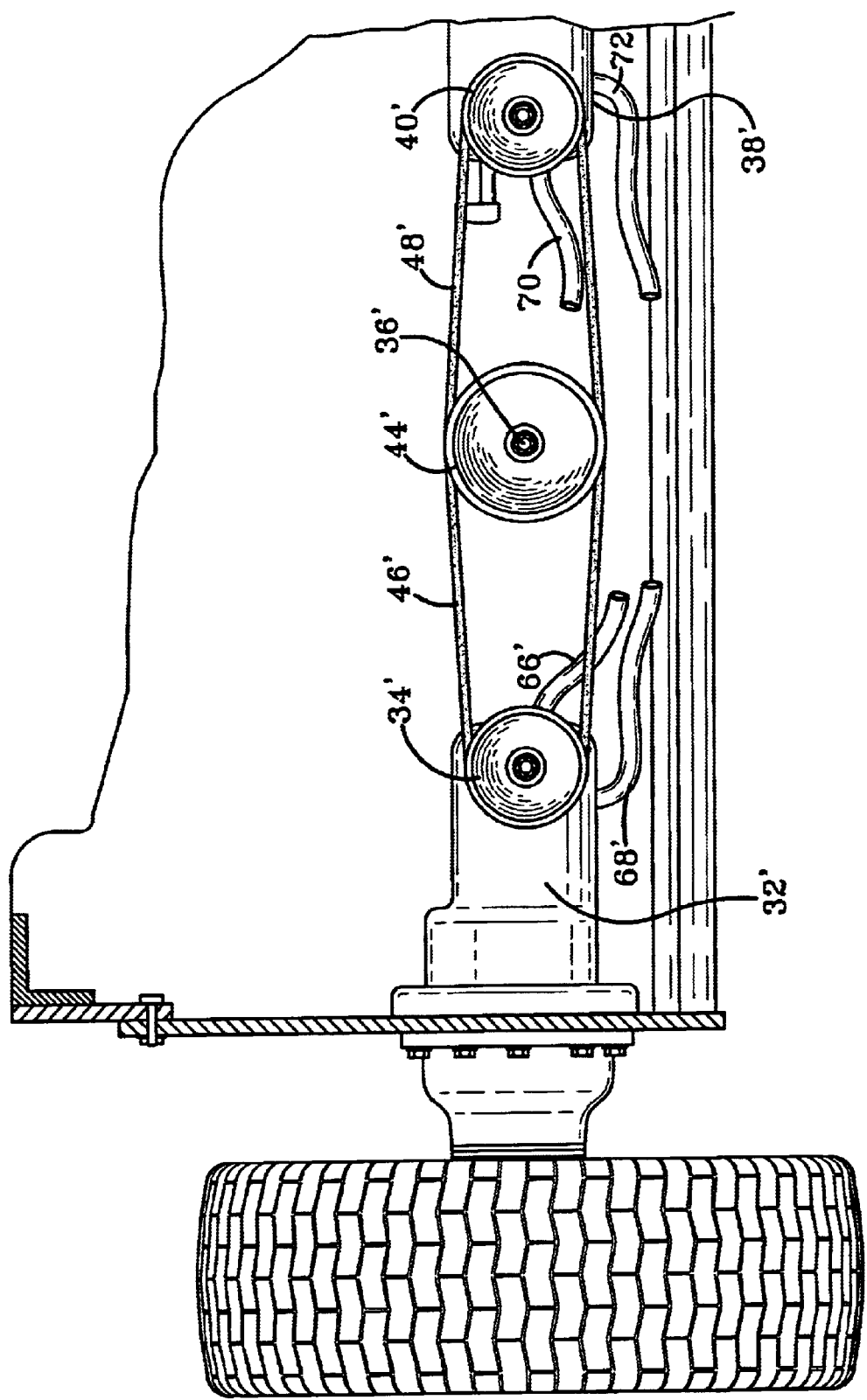
FIG. 6 is an elevation like FIG. 1 of a second embodiment with the power take off having a horizontal shaft.

Referring to FIG. 6 a modification is shown in which the power shaft 36' extends in a horizontal direction and similar parts are identified with the same numerals, but with an apostrophe for this modification. In order to drive the hydraulic pumps 32' and 38' with the power shaft 36' the pumps are rotated to the position shown in FIG. 6. The pulleys 34' and 40' rotate about horizontal axes and the V-belts 46' and 48' may then be trained over the drive pulleys 40' and 44'.

It is to be understood that the controls for the traction motor 50 mounted on end plate 20 and the traction motor mounted on end plate 22 are well known in the art and also the hydraulic hoses 66, 67, 68, 69, 70, 71, and 72 attached to the hydraulic pumps 32 and 38 may be connected to suitable components on the main frame 12. These connections may be of a quick disconnect type.

In the manufacture of the lawn mower, traction motors 50 and the hydraulic pumps 32 and 38 are mounted on the sub-frames 14. By mounting the assembled sub-frame 14 on the main frames 12 the manufacture of the lawn mowers is simplified. The sub-frame assembly may also be stock piled to facilitate assembly of the mowers.

In addition to this advantage in assembling the mower, the service and maintenance are facilitated by the ability to move the sub-frame 14 and the attached components as a unit. This makes repair easier because the unit sub-frame is separate and can be pulled away from the main frame as a unit. It also can be replaced with a substitute sub-frame assembly 14, which can be mounted on the main frame and the defective sub-frame assembly transported back to a maintenance facility, which is adapted to repair the parts of the sub-frame assembly.

The invention has been described with reference to the preferred embodiments. Obvious modifications and alterations will occur to others upon reading of the specification. It is intended by the applicant to include all modifications and alterations in so far that they come within the scope of the appended claims or the equivalents thereof. Having thus described the invention, it is now claimed:

We claim:

1. A lawn mower comprising a main frame, a sub-frame mounted on said main frame, wherein said sub-frame is bolted on said main frame for ease of installation and removal, traction motors mounted on said sub-frame and having shafts for driving engagement with wheels of said mower, hydraulic pumps mounted on said sub-frame, pump driven pulleys mounted on said hydraulic pumps, main frame mower drive pulleys mounted on said main frame and pump belts trained around said pump driven pulleys and said mower drive pulleys; wherein, said sub-frame end plates connected by tie rods, each of said end plates supporting one of said traction motors on an outer side and one of said frame pumps on an inner side and each of said pump driven pulleys being connected to said mower drive pulleys mounted on a main frame mower drive shaft.

2. A lawn mower according to claim 1 further comprising said main frame mower drive shaft being in a generally vertical portion and said pump drive pulleys being rotatable about generally vertical axes.

3. A lawn mower according to claim 1 further comprising a main frame mower drive shaft being in a generally horizontal position and said pump drive pulleys being rotated about generally horizontal axes.

* * * * *